(12) United States Patent
Cheng et al.

(10) Patent No.: US 6,749,975 B2
(45) Date of Patent: Jun. 15, 2004

(54) METHOD OF UTILIZING COLOR PHOTORESIST TO FORM BLACK MATRIX AND SPACERS ON A CONTROL CIRCUIT SUBSTRATE

(75) Inventors: Jia-Shyong Cheng, Hsinchu Hsien (TW); Yu-Fang Wang, Taoyuan (TW)

(73) Assignee: Hannstar Display Corporation (TW)

( * ) Notice: Subject to any disclaimer, the term of this patent is extended or adjusted under 35 U.S.C. 154(b) by 0 days.

(21) Appl. No.: 10/430,750

(22) Filed: May 6, 2003

(65) Prior Publication Data

US 2004/0096756 A1 May 20, 2004

(30) Foreign Application Priority Data

Nov. 20, 2002 (TW) ........................ 91133898 A

(51) Int. Cl.7 ..................... G02B 5/20; G03F 1/1335
(52) U.S. Cl. ........................... 430/7; 349/106
(58) Field of Search ................. 430/7; 349/106

(56) References Cited

U.S. PATENT DOCUMENTS 4,470,667 A * 9/1984 Okubo et al. .................. 349/42
6,323,921 B1 * 11/2001 Kurauchi et al. ........... 349/106

FOREIGN PATENT DOCUMENTS

JP  2002-055335 A * 2/2002

* cited by examiner

Primary Examiner—John A. McPherson
(74) Attorney, Agent, or Firm—Webb Ziesenheim Logsdon Orkin & Hanson, P.C.

(57) ABSTRACT

A method of utilizing color photoresist to form black matrix and spacers on a control circuit substrate is described. Utilizing the character of the red and the blue photoresist having a non-overlapping transmittance region in the visible light region, a black matrixes consisting of overlapping red and blue photoresist on control devices are used to prevent the photo current occurring in the off state of the control devices. In addition, three different color photoresist plus another-color photoresist are overlapped to form spacers on metal lines.

28 Claims, 3 Drawing Sheets

METHOD OF UTILIZING COLOR PHOTORESIST TO FORM BLACK MATRIX AND SPACERS ON A CONTROL CIRCUIT SUBSTRATE

BACKGROUND OF THE INVENTION

1. Field of Invention

The present invention relates to a structure of a color liquid crystal display (LCD) and a method of producing the same. More particularly, the present invention relates to a method of utilizing color photoresist to form black matrix and spacers on a control circuit substrate and the LCD structure fabricated by the same method.

2. Description of Related Art

Liquid crystal is a material having properties between those of crystal and liquid. The alignment of the liquid crystal molecules varies with external stimulation such as an electrical field generated by an applied voltage. Hence, this feature of the liquid crystal molecules can be utilized to create a display unit.

Liquid crystal material was discovered in 1888, and applications thereof first appeared in 1963. However, the value of the commercial application was not proved until Sharp in Japan developed a liquid crystal display applied in a calculator. Japanese companies have continued to develop the technology and improve the product's function. Development and improvement have made the liquid crystal display widely applicable.

Liquid crystal display (LCD) has many advantages over other conventional types of displays including high display quality, small volume occupation, light weight, low voltage drive and low power consumption. Hence, LCDs are widely used in small portable televisions, mobile telephones, video recording units, notebook computers, desktop monitors, projector televisions and so on. Therefore, the LCD has gradually replaced the conventional cathode ray tube (CRT) as a mainstream display unit. In particular, the thin film transistor (TFT) LCD has the lion's share of the market for its high display quality.

The color filter on array (COA) technique is the most common in color TFT LCD production. Black matrix, which separates pixels, is located on the color filter and which prevents photo current, is located on the TFTs, and spacers on the metal lines are usually made of black resin. The black matrix and the spacers are usually formed after the color photoresist and the pixel electrodes are formed. The black resin of the photoresist type is patterned by photolithography. However, the light transmittance and sensitivity of the photoresist-type black resin is very poor. Therefore, the exposure time has to be increased to obtain ideal patterns, and the throughput of the stepper is seriously affected.

SUMMARY OF THE INVENTION

It is therefore an objective of the present invention to provide a method of utilizing color photoresist to form black matrix and spacers on a control circuit substrate.

It is another objective of the present invention to provide a LCD structure fabricated by the same method of utilizing color photoresist to form black matrix and spacers on a control circuit substrate.

In accordance with the foregoing and other objectives of the present invention, a method of utilizing color photoresist to form black matrix and spacers on a control circuit substrate Is provided. A control circuit, made of control devices and a chessboard-like circuit, is formed on the control circuit substrate. The chessboard-like circuit has first openings, second openings, third openings and supporting areas, and the control devices are formed on corners of the first, the second and the third openings, respectively. The method comprises the following steps. A first-color photoresist is formed on the control circuit substrate, and then the first-color photoresist is patterned to form first-color filters on the first openings, the control devices and the supporting areas, respectively, and form contact windows in the first-color filters is to expose electrodes of the control devices, respectively. A second-color photoresist is formed on the control circuit substrate, and then the second-color photoresist is patterned to form second-color filters on the second openings and the supporting areas, respectively. A third-color photoresist is formed on the control circuit substrate, and then the third-color photoresist is patterned to form third-color filters on the third openings and the supporting areas, respectively. A first transparent conductive layer is formed on the control circuit substrate. Next, the first transparent conductive layer is patterned to form pixel electrodes on the first openings, the second openings, the third openings and partial areas of the control devices, and the pixel electrodes electrically connect to the electrodes of the control devices through the contact windows, respectively. A fourth-color photoresist is formed on the control circuit substrate, and then the fourth-color photoresist is patterned to form fourth-color filters on the supporting areas and the control devices, respectively.

According to a preferred embodiment, the first-color photoresist, the second-color photoresist, the third-color photoresist and the fourth-color photoresist are red-color photoresist, green-color photoresist, blue-color photoresist and blue-color photoresist, respectively, or blue-color photoresist, green-color photoresist, red-color photoresist and red-color photoresist, respectively. The method of patterning the first-color photoresist, the second-color photoresist, the third-color photoresist and the fourth-color photoresist comprises photolithography.

In accordance with the foregoing and other objectives of the present invention, a color liquid crystal display is provided. The color liquid crystal display comprises a first transparent substrate, a control circuit on the first transparent substrate, first-color filters, second-color filters, third-color filters, pixel electrodes, fourth-color filters, a second transparent substrate, a common electrode, and a liquid crystal layer. The control circuit, comprises of control devices and a chessboard-like circuit, is on the first transparent substrate. The chessboard-like circuit has first openings, second openings, third openings and supporting areas, and the control devices are located on corners of the first, the second and the third openings, respectively. The first-color filters are located on the first openings, the control devices and the supporting areas, respectively, and each of the first-color filters located on the control devices has a contact window to expose electrodes of the control devices, respectively. The second-color filters are located on the second openings and the supporting areas, respectively. The third-color filters are located on the third openings and the supporting areas, respectively. The pixel electrodes are located on the first openings, the second openings, the third openings and partial areas of the control devices, and the pixel electrodes electrically connect to the electrodes of the control devices through the contact windows, respectively. The fourth-color filters are located on the supporting areas and the control devices, respectively, whereby the first-color filters, the second-color filters, the third-color filters and the fourth-color filters on the supporting areas are stacked to form spacers. The common electrode is on a surface, which faces the first transparent substrate, of the second transparent substrate. The liquid crystal layer is located between the first and the second transparent substrates.

According to a preferred embodiment, the first-color photoresist, the second-color photoresist, the third-color photoresist and the fourth-color photoresist are red-color photoresist, green-color photoresist, blue-color photoresist and blue-color photoresist, respectively, or blue-color photoresist, green-color photoresist, red-color photoresist and red-color photoresist, respectively.

In conclusion, the invention utilizes the lack of overlap between the light transmittance wave bands of the red-photoresist and the blue-photoresist. Hence, the black matrix is formed on the control devices only by the red-photoresist and the blue-photoresist to avoid photocurrent occurring during the "off" state of the control devices. Moreover, the invention allows the spacers to be formed by stacking four layers of color filters of the color of the red, green, blue, and blue or the blue, green, red, and red on the supporting areas on the metal lines. Since the light transmittance and sensitivity of the color photoresists are much better than those of the black resin, the exposure time can be greatly reduced to increase the throughput of the stepper.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
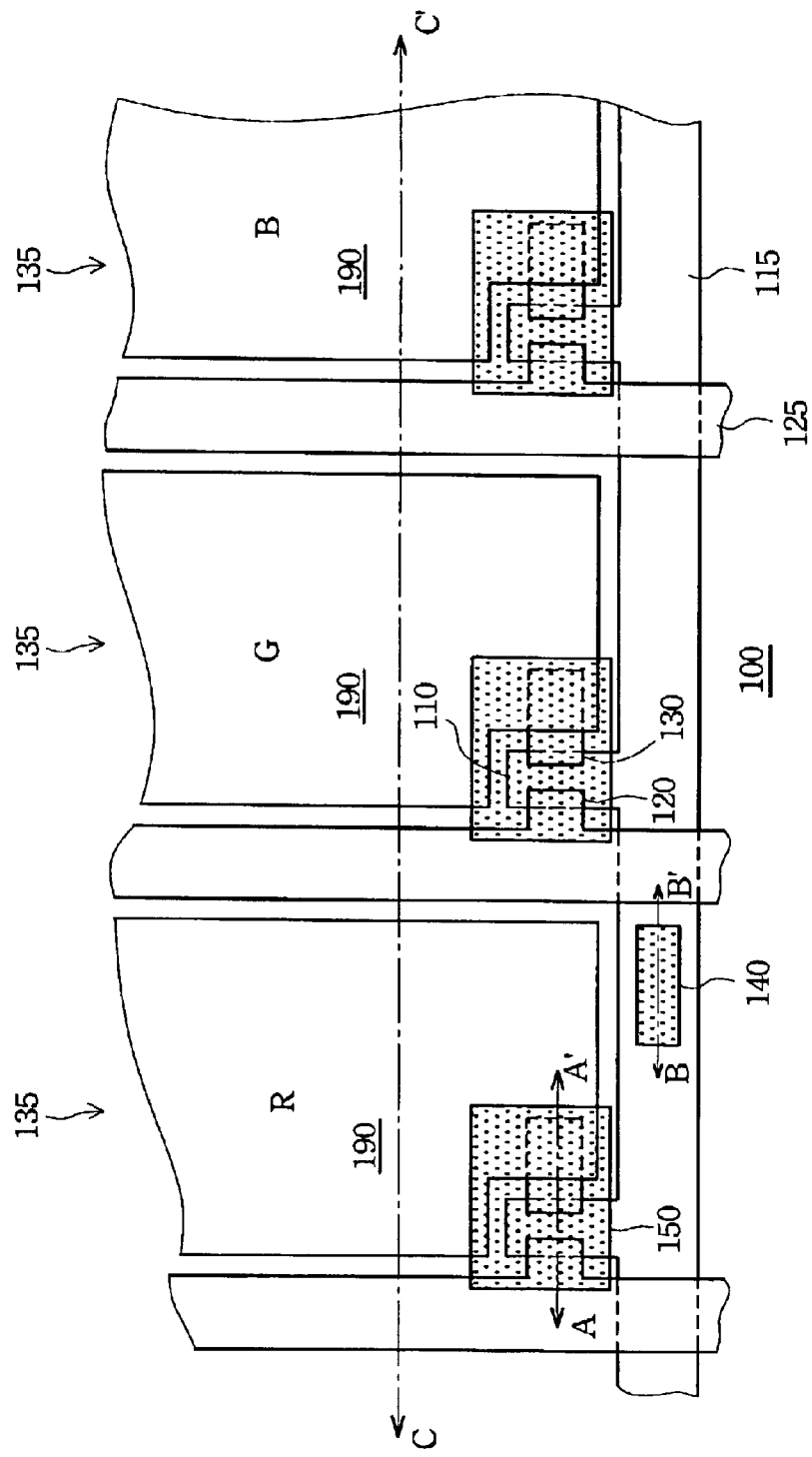
FIG. 1 is a plane view of a control circuit substrate according to one preferred embodiment.

Reference will now be made in detail to the present preferred embodiments of the invention, examples of which are illustrated in the accompanying drawings. Wherever possible, the same reference numbers are used in the drawings and the description to refer to the same or like parts.

As stated above, this invention provides a method of utilizing color photoresist to form black matrix and spacers on a control circuit substrate and a LCD structure fabricated by the same method to increase the product throughput.

FIG. 1 is a plane view of a control circuit substrate according to one preferred embodiment. In FIG. 1, a control circuit , such as a thin film transistor (TFT) array, is formed on a transparent substrate 100. Each TFT in the TFT array comprises gate 110, source 120 and drain 130. Each gate 110 electrically connects a gate line 115 made by a first metal layer. Each source 120 electrically connects a data line 125 made by a second metal layer. The data lines 125 cross over the gate lines 115 to define pixels 135. Red (R), green (G) and blue (B) color filters are respectively formed on each pixel 135 later, and each TFT is respectively located in a corner of each pixel 135.

The black matrixes are formed on the areas 150 above the TFTs to prevent photocurrent occurring during the "off" state of the TFTs. The spacers are formed on areas that are not penetrable by light such as supporting areas 140 on the gate lines 115. The material of the gate lines 115 and the data lines 125 is metal, which is an opaque material. Therefore, black matrixes do not need to be formed on the gate lines 115 and the data lines 125 to compartment adjacent pixels 135. In FIG. 1, the relative positions of the pixel electrodes 190 formed later and the TFT are also displayed.

FIGS. 2–6 are cross-sectional diagrams of forming black matrix and spacers by color photoresists on the control circuit substrate in FIG. 1 according to the preferred embodiment of this invention. The labels A, B, and C in FIGS. 2–6 indicate the cross-sectional views of the cross-sectional lines AA', BB' and CC', respectively. The TFT structures are not drawn on the A parts in FIGS. 2–6 to simplify the pictures.

Figure 2:
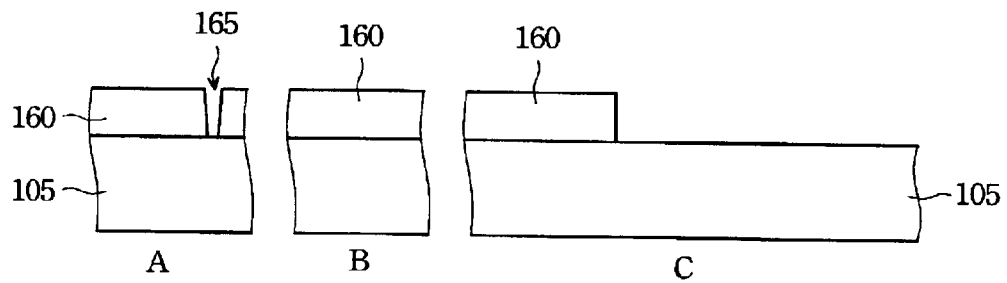
FIGS. 2–6 are cross-sectional diagrams of forming black matrix and spacers by color photoresists on the control circuit substrate in FIG. 1 according to the preferred embodiment of this invention. The labels A, B, and C in FIGS. 2–6 indicated the cross-sectional views of the cross-sectional lines AA', BB' and CC', respectively.

In FIG. 2, a red-color photoresist (not shown in FIG. 2) is formed on the TFT substrate 105 (i.e. the transparent substrate 100 having the TFT array). The red-color photoresist is pattered to form red-color filters 160 on areas 150 (Part A), the supporting areas 140 (Part B), and the pixel 135 (Part C), respectively. The patterning method is, for example, photolithography. A contact window 165 is also formed in the red-color filter 160 on areas 150 (Part A) to expose the drain 130 of the TFT.

Figure 3:
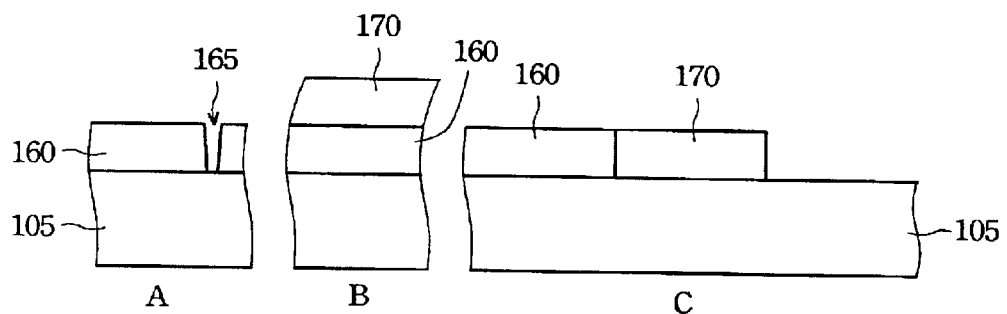

In FIG. 3, a green-color photoresist (not shown in FIG. 3) is formed on the TFT substrate 105 and then is patterned to form green-color filters 170 on the supporting areas 140 (Part B) and pixel 135 (Part C), respectively. The patterning method is, for example, photolithography.

Figure 4:
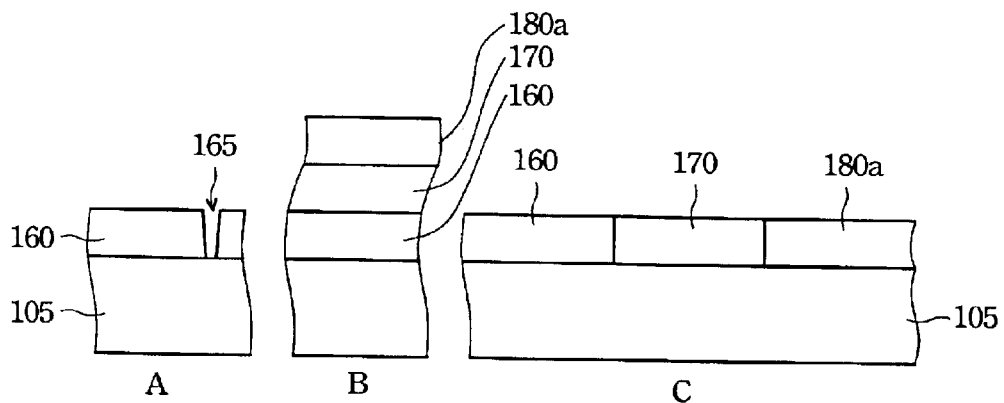

In FIG. 4, a blue-color photoresist (not shown in FIG. 3) is formed on the TFT substrate 105 and then is patterned to form blue-color filters 180a on the supporting areas 140 (Part B) and pixel 135 (Part C), respectively. The patterning method is, for example, photolithography.

Figure 5:
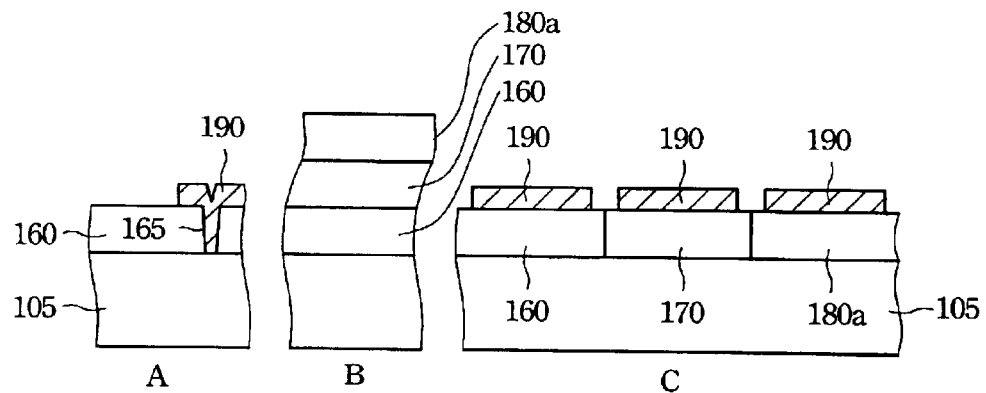

In FIG. 5, a transparent conductive layer (not shown in FIG. 5) is formed on the TFT substrate 105. Next, the transparent conductive layer is patterned to form pixel electrodes 190 respectively on the red-color filters 160, green-color filters 170, and blue-color filters 180a on pixels 135 (Part C), in which a portion of the pixel electrodes 190 overlap with drain 130 (please refer to FIG. 1 and part A in FIG. 5) to electrically connect the drain 130 through the contact window 165. The material of the transparent conductive layer is, for example, indium tin oxide or the like.

Figure 6:
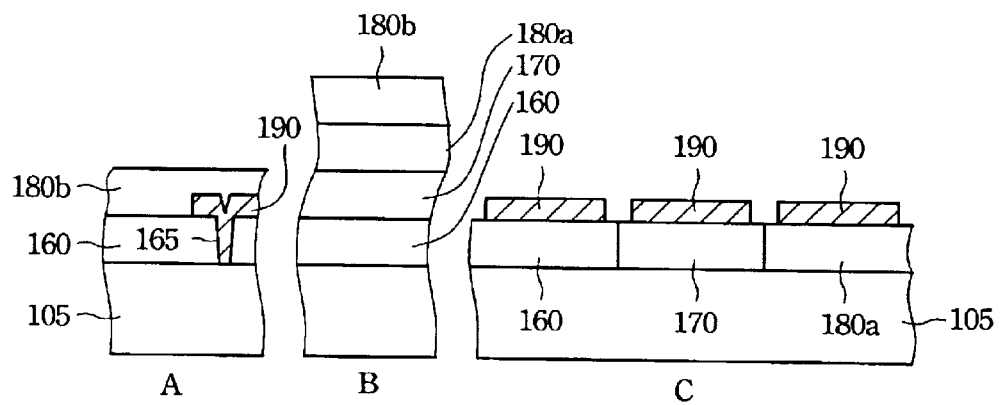

In FIG. 6, a blue-color photoresist (not shown in FIG. 6) is formed on the TFT substrate 105 and then is patterned to form blue-color filters 180b respectively on the supporting areas 140 (Part B) and the areas 150 (Part A). The patterning method is, for example, photolithography. Therefore, the red-color filters 160 and the blue-color filters 180b are stacked on the areas 150 (Part A), and the red-color filters 160, green-color filters 170, blue-color filters 180a and the blue-color filters 180b are stacked on the supporting areas 140 (Part B) to form stacked spacers.

According to another preferred embodiment, the colors of the red-color filters 160 and the blue-color filters 180b are exchanged, and the colors of the green-color filters 170 and the blue-color filters 180a are exchanged. According to yet another preferred embodiment, the color of the red-color filters 160 is changed to blue, and the blue-color filters 180a and 180b are changed to red.

The subsequent fabrication processes are well known by persons skilled in the art. Hence, the cross-sectional diagrams of the fabrication processes are omitted here, and subsequent fabrication processes are described verbally, only.

Next, another transparent conductive layer is formed on another transparent substrate to be a common electrode. These two transparent substrates are parallel assembled, and the pixel electrodes 180 and the common electrode face each other. The periphery of the two transparent substrates is sealed, and only one opening is left for pouring liquid crystal into the space between the two transparent substrates. After pouring in the liquid crystal to fill the space between the two transparent substrates, the opening is sealed to accomplish the fabrication process of a TFT LCD.

In conclusion, the invention utilizes a lack of overlap between the light transmittance wave bands of the red-photoresist and the blue-photoresist. Hence, the black matrix is formed on the control devices only by the red-photoresist and the blue-photoresist to avoid photocurrent occurring during the "off" state of the control devices. Moreover, the invention allows the spacers to be formed by stacking four layers of color filters of the color of red, green, blue, and blue or blue, green, red, and red on the supporting areas on the metal lines. Since the light transmittance and sensitivity of the color photoresists are much better than those of the black resin, the exposure time can be greatly reduced to increase the throughput of the stepper.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of utilizing color photoresist to form black matrix and spacers on a control circuit substrate, the control circuit substrate having a control circuit, made of control devices and a chessboard-like circuit, formed thereon, the chessboard-like circuit having first openings, second openings, third openings and supporting areas, and the control devices being formed on corners of the first, the second and the third openings, respectively, the method comprising:

forming a first-color-photoresist on the control circuit substrate;

patterning the first-color photoresist to form first-color filters on the first openings, the control devices and the supporting areas, respectively, and form contact windows in the first-color filters to expose electrodes of the control devices, respectively;

forming a second-color photoresist on the control circuit substrate;

patterning the second-color photoresist to form second-color filters on the second openings and the supporting areas, respectively;

forming a first third-color photoresist on the control circuit substrate;

patterning the first third-color photoresist to form first third-color filters on the third openings and the supporting areas, respectively;

forming a first transparent conductive layer on the control circuit substrate;

patterning the first transparent conductive layer to form pixel electrodes on the first openings, the second openings, the third openings and partial areas of the control devices, the pixel electrodes electrically connecting to the electrodes of the control devices through the contact windows, respectively;

forming a second third-color photoresist on the control circuit substrate; and patterning the second third-color photoresist to form second third-color filters on the supporting areas and the control devices, respectively.

2. The method of claim 1, wherein the first transparent conductive layer is made of indium tin oxide.

3. The method of claim 1, wherein the first-color photoresist is red-color photoresist, the second-color photoresist is green-color photoresist, and the first and the second third-color photoresist are blue-color photoresist.

4. The method of claim 1, wherein the first-color photoresist is blue-color photoresist, the second-color photoresist is green-color photoresist, and the first and the second third-color photoresist are red-color photoresist.

5. The method of claim 1, wherein the first-color photoresist, the second-color photoresist and the third-color photoresist are patterned by photolithography.

6. The method of claim 1, further comprising:

forming a second transparent conductive layer on a transparent substrate to form a common electrode;

parallel assembling the control circuit substrate, the transparent substrate, and the pixel electrode, the common electrode being located inside;

sealing a periphery of the control circuit substrate and the transparent substrate and leaving an opening only;

pouring liquid crystal into the opening to fill a space between the control circuit substrate and the transparent substrate; and sealing the opening.

7. A method of utilizing color photoresist to form black matrix and spacers on a control circuit substrate, the control circuit substrate having a control circuit, made of control devices and a chessboard-like circuit, formed thereon, the chessboard-like circuit having first openings, second openings, third openings and supporting areas, and the control devices being formed on corners of the first, the second and the third openings, respectively, the method is comprising:

forming a first-color-photoresist on the control circuit substrate;

patterning the first-color photoresist to form first-color filters on the first openings, the control devices and the supporting areas, respectively, and to form contact windows in the first-color filters to expose electrodes of the control devices, respectively;

forming a second-color photoresist on the control circuit substrate;

patterning the second-color photoresist to form second-color filters on the second openings and the supporting areas, respectively;

forming a third-color photoresist on the control circuit substrate;

patterning the third-color photoresist to form third-color filters on the third openings and the supporting areas, respectively;

forming a first transparent conductive layer on the control circuit substrate;

patterning the first transparent conductive layer to form pixel electrodes on the first openings, the second openings, the third openings and partial areas of the control devices, wherein the pixel electrodes electrically connect to the electrodes of the control devices through the contact windows, respectively;

forming a fourth-color photoresist on the control circuit substrate; and patterning the fourth-color photoresist to form fourth-color filters on the supporting areas and the control devices, respectively.

8. The method of claim 7, wherein the first transparent conductive layer is made of indium tin oxide.

9. The method of claim 7, wherein colors of the third-color photoresist and the fourth-color are identical.

10. The method of claim 7, wherein the first-color photoresist is red-color photoresist, the second-color photoresist is green-color photoresist, and the third-color and the fourth-color photoresists are blue-color photoresist.

11. The method of claim 7, wherein the first-color photoresist is blue-color photoresist, the second-color photoresist is green-color photoresist, and the third-color and the fourth-color photoresists are red-color photoresist.

12. The method of claim 7, wherein the first-color photoresist, the second-color photoresist, the third-color photoresist and the fourth-color photoresist are patterned by photolithography.

13. The method of claim 7, further comprising:
forming a second transparent conductive layer on a transparent substrate to form a common electrode;
parallel assembling the control circuit substrate and the transparent substrate, wherein the pixel electrode and the common electrode being located inside;
sealing a periphery of the control circuit substrate and the transparent substrate and leaving an opening only;
pouring liquid crystal into the opening to fill a space between the control circuit substrate and the transparent substrate; and
sealing the opening.

14. A color liquid crystal display, comprising:
a first transparent substrate;
a control circuit on the first transparent substrate, the control circuit being constituted by control devices and a chessboard-like circuit, the chessboard-like circuit having first openings, second openings, third openings and supporting areas, and the control devices being located on corners of the first, the second and the third openings, respectively;
a plurality of first-color filters located on the first openings, the control devices and the supporting areas, respectively, each of the first-color filters on the control devices having a contact window to expose electrodes of the control devices, respectively;
a plurality of second-color filters located on the second openings and the supporting areas, respectively;
a plurality of first third-color filters located on the third openings and the supporting areas, respectively;
a plurality of pixel electrodes located on the first openings, the second openings, the third openings and partial areas of the control devices, wherein the pixel electrodes electrically connect to the electrodes of the control devices through the contact windows, respectively;
a plurality of second third-color filters located on the supporting areas and the control devices respectively, whereby the first-color filters, the second-color filters, the first third-color filters and the second third-color filters on the supporting areas are stacked to form spacers;

a second transparent substrate;
a common electrode located on a surface facing the first transparent substrate of the second transparent substrate; and
a liquid crystal layer located between the first and the second transparent substrates.

15. The color liquid crystal display of claim 14, wherein the first-color filters are red-color filters, the second-color filters are green-color filters, and the first and the second third-color filters are blue-color filters.

16. The color liquid crystal display of claim 14, wherein the first-color filters are blue-color filters, the second-color filters are green-color filters, and the first and the second third-color filters are red-color filters.

17. The color liquid crystal display of claim 14, wherein a material of the first transparent substrate comprises glass or quartz.

18. The color liquid crystal display of claim 14, wherein a material of the pixel electrodes comprises indium tin oxide.

19. The color liquid crystal display of claim 14, wherein a material of the common electrode comprises a transparent conductive material.

20. The color liquid crystal display of claim 14, wherein a material of the second transparent substrate comprises glass or quartz.

21. A color liquid crystal display, comprising:
a first transparent substrate;
a control circuit located on the first transparent substrate, the control circuit being constituted by control devices and a chessboard-like circuit, the chessboard-like circuit having first openings, second openings, third openings and supporting areas, and the control devices being located on corners of the first, the second and the third openings, respectively;
first-color filters located on the first openings, the control devices and the supporting areas, respectively, each of the first-color filters on the control devices having a contact window to expose electrodes of the control devices, respectively;
second-color filters located on the second openings and the supporting areas, respectively;
third-color filters located on the third openings and the supporting areas, respectively;
pixel electrodes located on the first openings, the second openings, the third openings and partial areas of the control devices, the pixel electrodes electrically connecting to the electrodes of the control devices through the contact windows, respectively;
fourth-color filters located on the supporting areas and the control devices respectively, whereby the first-color filters, the second-color filters, the third-color filters and the fourth-color filters on the supporting areas are stacked to form spacers;
a second transparent substrate;
a common electrode located on a surface facing the first transparent substrate of the second transparent substrate; and
a liquid crystal layer located between the first and the second transparent substrates.

22. The color liquid crystal display of claim 21, wherein the third-color filters and the fourth-color filters are identical in color.

23. The color liquid crystal display of claim 21, wherein the first-color filters are red-color filters, the second-color filters are green-color filters, and the third-color filters and the fourth-color filters are blue-color filters.

24. The color liquid crystal display of claim 21, wherein the first-color filters are blue-color filters, the second-color filters are green-color filters, and the third-color filters and the fourth-color filters are red-color filters.

25. The color liquid crystal display of claim 21, wherein a material of the first transparent substrate comprises glass or quartz.

26. The color liquid crystal display of claim 21, wherein a material of the pixel electrodes comprises indium tin oxide.

27. The color liquid crystal display of claim 21, wherein a material of the common electrode comprises a transparent conductive material.

28. The color liquid crystal display of claim 21, wherein a material of the second transparent substrate comprises glass or quartz.

* * * * *

UNITED STATES PATENT AND TRADEMARK OFFICE
CERTIFICATE OF CORRECTION

PATENT NO. : 6,749,975 B2  Page 1 of 1
DATED : June 15, 2004
INVENTOR(S) : Cheng et al.

It is certified that error appears in the above-identified patent and that said Letters Patent is hereby corrected as shown below:

Column 5,
Line 46, "first-color-photoresist" should read -- first-color photoresist --

Column 6,
Line 43, "the method is comprising" should read -- the method comprising --
Line 46, "first-color-photoresist" should read -- first-color photoresist --

Column 7,
Line 12, "fourth-color are identical" should read -- fourth-color photoresist are identical --

Signed and Sealed this

Fourteenth Day of December, 2004

JON W. DUDAS
*Director of the United States Patent and Trademark Office*